(12) United States Patent
Dahlstrom et al.

(10) Patent No.: US 10,440,121 B2
(45) Date of Patent: Oct. 8, 2019

(54) ENDPOINTS FOR PERFORMING DISTRIBUTED SENSING AND CONTROL AND METHODS OF OPERATING THE SAME

(71) Applicant: Web Sensing, LLC, Hanover, NH (US)

(72) Inventors: Jason Dahlstrom, White River Junction, VT (US); Stephen Taylor, Hanover, NH (US)

(73) Assignee: Web Sensing, LLC, Hanover, NH (US)

( * ) Notice: Subject to any disclaimer, the term of this patent is extended or adjusted under 35 U.S.C. 154(b) by 315 days.

(21) Appl. No.: 15/077,510

(22) Filed: Mar. 22, 2016

(65) Prior Publication Data
US 2016/0301756 A1      Oct. 13, 2016

Related U.S. Application Data

(60) Provisional application No. 62/145,353, filed on Apr. 9, 2015, provisional application No. 62/152,627, filed on Apr. 24, 2015.

(51) Int. Cl.
*G06F 15/173*      (2006.01)
*H04L 29/08*      (2006.01)
(Continued)

(52) U.S. Cl.
CPC .......... *H04L 67/125* (2013.01); *G06F 9/4401* (2013.01); *G06F 9/4406* (2013.01);
(Continued)

(58) Field of Classification Search
CPC ............... H04L 67/125; H04L 63/0414; H04L 63/0428; H04L 63/06; G06F 9/4401; G06F 9/4406
See application file for complete search history.

(56) References Cited

U.S. PATENT DOCUMENTS 4,657,179 A    4/1987 Aggers et al.
4,742,475 A    5/1988 Kaiser et al.
(Continued)

OTHER PUBLICATIONS

Allen-Bradley, 1747-SDN DeviceNet Scanner Module, Jun. 2007, Rockwell Automation, Catalog No. 1747-SDN, Series C, 160 pages.*

(Continued)

*Primary Examiner* — Richard G Keehn
(74) *Attorney, Agent, or Firm* — Michael Best & Friedrich LLP

(57) ABSTRACT

An endpoint and methods of operating the same. In one embodiment, an endpoint is connected to one or more sensors and/or actuators. The endpoint is also connected through a communication channel to a server. Each endpoint uses a unique identifier ("ID") hidden within a protected boundary of the endpoint to associate with a lockless, single-writer thread on the server dedicated to the endpoint. The endpoint ID is encrypted within the protected boundary of the endpoint and is not communicated unencrypted. Furthermore, no association between the ID and private information associated with reader, analysis, or control threads at the server is available outside of a protected boundary of the server and this association is never transmitted on a communication channel. The endpoint can include one or more communication interfaces (e.g., of different modalities) to provide resilience to failures, errors, and computer network attacks.

27 Claims, 11 Drawing Sheets

(51) Int. Cl.
*G06F 9/4401* (2018.01)
*H04L 29/06* (2006.01)

(52) U.S. Cl.
CPC ...... *H04L 63/0414* (2013.01); *H04L 63/0428* (2013.01); *H04L 63/06* (2013.01)

(56) References Cited

U.S. PATENT DOCUMENTS

| | | |
|---|---|---|
| 4,845,486 A | 7/1989 | Knight et al. |
| 5,090,242 A | 2/1992 | Hilton |
| 5,224,648 A | 7/1993 | Simon et al. |
| 5,544,036 A | 8/1996 | Brown, Jr. et al. |
| 5,595,342 A | 1/1997 | McNair et al. |
| 5,619,560 A | 4/1997 | Shea |
| 5,635,896 A | 6/1997 | Tinsley et al. |
| 5,708,424 A | 1/1998 | Orlando et al. |
| 5,802,467 A | 9/1998 | Salazar et al. |
| 6,385,510 B1 | 5/2002 | Hoog et al. |
| 6,564,632 B2 | 5/2003 | Ross, Jr. |
| 6,619,055 B1 | 9/2003 | Addy |
| 6,619,555 B2 | 9/2003 | Rosen |
| 6,622,925 B2 | 9/2003 | Carner et al. |
| 6,715,514 B2 | 4/2004 | Parker, III et al. |
| 6,798,341 B1 | 9/2004 | Eckel et al. |
| 6,874,085 B1 | 3/2005 | Koo et al. |
| 7,039,810 B1 | 5/2006 | Nichols |
| 7,055,759 B2 | 6/2006 | Wacker et al. |
| 7,092,891 B2 | 8/2006 | Maus et al. |
| 7,155,349 B1 | 12/2006 | Souluer |
| 7,289,887 B2 | 10/2007 | Rodgers |
| 7,333,921 B2 | 2/2008 | Taylor et al. |
| 7,424,437 B2 | 9/2008 | Maus et al. |
| 7,516,082 B2 | 4/2009 | Sanville et al. |
| 7,533,703 B2 | 5/2009 | Shuey |
| 7,536,548 B1* | 5/2009 | Batke .............. H04L 63/061 713/166 |
| 7,605,714 B2 | 10/2009 | Thompson et al. |
| 7,702,424 B2 | 4/2010 | Cannon et al. |
| 7,944,352 B2 | 5/2011 | Drake et al. |
| 8,079,245 B1 | 12/2011 | Owens et al. |
| 8,161,529 B1 | 4/2012 | Bortz et al. |
| 8,620,841 B1 | 12/2013 | Filson et al. |
| 8,694,600 B2 | 4/2014 | Gaines et al. |
| 8,843,997 B1 | 9/2014 | Hare |
| 8,943,168 B2 | 1/2015 | Wiesner et al. |
| 10,148,761 B2 | 12/2018 | Dahlstrom et al. |
| 2001/0045892 A1 | 11/2001 | Thomas et al. |
| 2002/0088278 A1 | 7/2002 | Ross |
| 2003/0084720 A1 | 5/2003 | Ross |
| 2004/0078229 A1 | 4/2004 | Gay et al. |
| 2005/0043907 A1 | 2/2005 | Eckel |
| 2005/0194456 A1 | 9/2005 | Tessier et al. |
| 2005/0270151 A1 | 12/2005 | Winick |
| 2006/0026039 A1 | 2/2006 | Shoenhair et al. |
| 2006/0105697 A1 | 5/2006 | Aronstam et al. |
| 2007/0075840 A1* | 4/2007 | Brandt .............. G01D 21/00 340/10.41 |
| 2007/0136603 A1 | 6/2007 | Kuecuekyan |
| 2008/0126352 A1* | 5/2008 | Case ............. G06F 17/30902 |
| 2008/0208914 A1 | 8/2008 | Navani |
| 2008/0274689 A1* | 11/2008 | Kuban .............. H04L 1/16 455/7 |
| 2010/0071054 A1 | 3/2010 | Hart |
| 2010/0114367 A1* | 5/2010 | Barrett .............. G06F 19/3456 709/206 |
| 2010/0265329 A1 | 10/2010 | Doneker |
| 2012/0154126 A1 | 6/2012 | Cohn et al. |
| 2012/0262303 A1 | 10/2012 | Fahey |
| 2013/0031037 A1* | 1/2013 | Brandt .............. H04L 67/12 706/12 |
| 2013/0034230 A1* | 2/2013 | Takahashi .......... H04W 12/02 380/270 |
| 2014/0040639 A1* | 2/2014 | Raam .............. G06F 21/606 713/193 |
| 2014/0217729 A1 | 8/2014 | Zaib et al. |
| 2016/0063279 A1 | 3/2016 | Hars |

OTHER PUBLICATIONS

Gould; "The PLC Gets Small"; Aug. 1, 2004; Automotive Design and Production; 5 pages.*
Xilinx, Zynq-700 SoC Technical Reference Manual, Jul. 1, 2018, 1843 pages.
Xilinx, Zynq UltraScale+ Device Technical Reference Manual, Aug. 3, 2018, 1181 pages.
Office Action from the US Patent and Trademark Office for U.S. Appl. No. 16/172,237 dated Jan. 2, 2019 (8 pages).

* cited by examiner

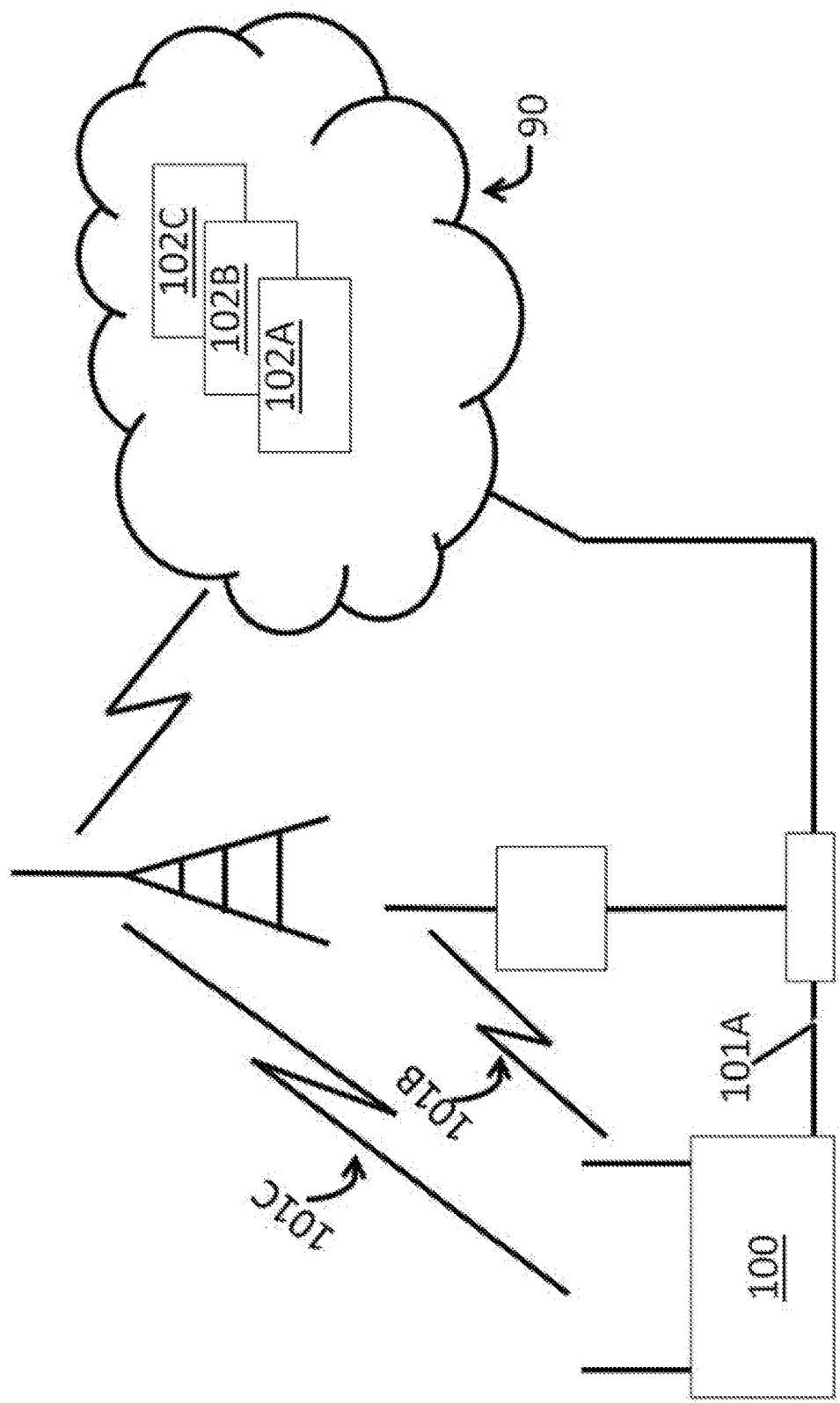

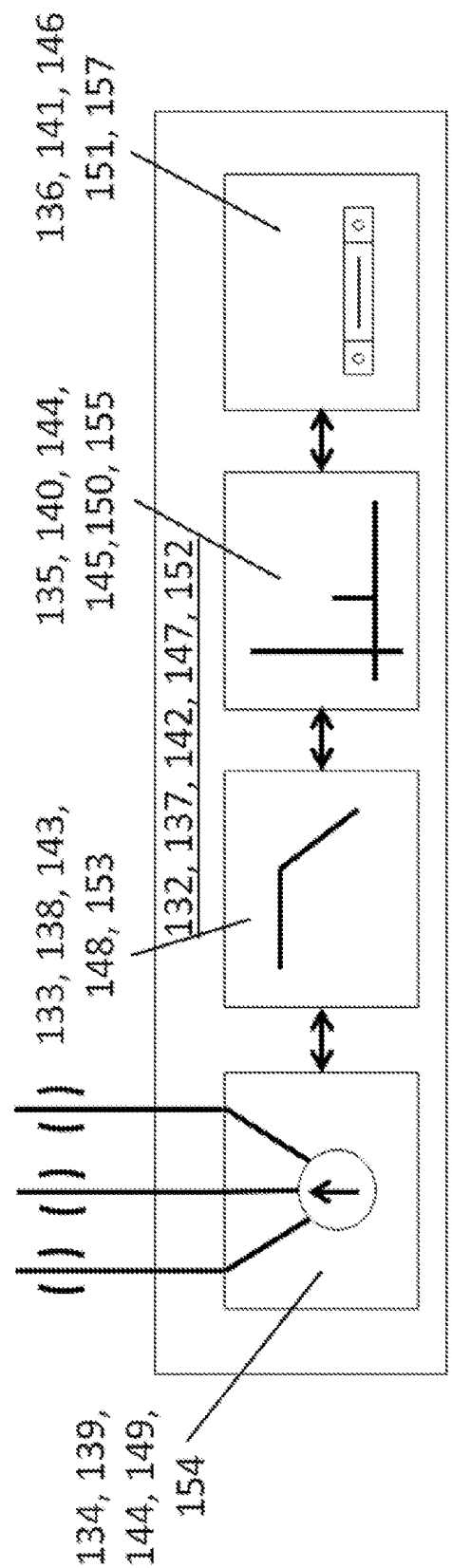

ENDPOINTS FOR PERFORMING DISTRIBUTED SENSING AND CONTROL AND METHODS OF OPERATING THE SAME

RELATED APPLICATIONS

This application claims priority to U.S. Provisional Application No. 62/145,353 filed Apr. 9, 2015, and U.S. Provisional Application No. 62/152,627 filed Apr. 24, 2015, and the entire content of both prior filed applications is incorporated by reference herein.

FIELD

Embodiments of the present invention relate to sensing and control systems. In particular, embodiments of the present invention relate to endpoints used in distributed sensing and control systems.

BACKGROUND

Sensing and control systems traditionally include a stand-alone control system with a limited number of physical interfaces. The physical interfaces use rudimentary electrical signaling, such as voltage and current levels, and, as a result, sensors and actuators must be proximal to the controller. Operators must also be physically present at the controller's operator interface to observe or alter the system. This type of configuration can incur significant operating and maintenance costs.

SUMMARY

Remote sensing and control systems typically incorporate more sophisticated electronic communication interfaces to increase the number of sensors per interface and to increase allowable distances between sensors, actuators, control systems, and operators. Accordingly, remote sensing and control systems offer increased sensor and actuator density per control system than as compared to non-remote sensing and control systems. However, the ability to increase communication distances within the system is often hampered by the high costs of running and maintaining wired connections throughout the system and/or the high costs of leasing long-distance communication channels from telecommunications service providers. Additionally, security is often not addressed in these types of systems (e.g., based on the expectation of physically isolated/private communications channels combined with the use of obscure/proprietary communications protocols).

Emerging technologies in long distance communications, such as the Internet and wireless networking, provide low-cost, long-distance communication and low-cost, rapid system deployment as well as opportunity for mobile system components. Furthermore, both wired and wireless communications can be used in hybrid systems, which can provide wireless connectivity in areas that are hazardous to humans and wired connectivity in penetrating routes. Distributed sensing and control systems use these emerging technologies to provide sensing and control at a distance. These systems increase sensor/actuator density per controller multiple times over previous systems. These systems also allow system components to span the globe and even space.

Distributed systems can include an endpoint, which provides a point of network presence and access for one or more fielded sensors and actuators (hereinafter referred to collectively as "field devices"). Endpoints can be integrated within a field device, can be external to a field device but dedicated to a single field device, or can include multiple interfaces supporting multiple concurrent field devices.

Distributed sensing and control systems face challenges relating to scalability, security, resiliency, and logistic support. In many instances, particularly in the case of mobile, battery-powered devices, solutions to these challenges must not only be robust but must be efficient in terms of computational overhead and electrical power requirements to be of practical utility.

Scalability refers to the ability of the number of field devices to scale from a small number to a large number (e.g., millions) (e.g., limited only by available bandwidth). Security refers to the ability to protect the endpoint itself, the associated communications, and private data associated with consumers of sensor data or actuator controls from malicious attacks or interference. Resiliency refers to the ability to sustain operation in the presence of errors, failures, and/or malicious attacks. Logistics support refers to the ability to use information provided by sensors to produce more effective systems for managing supply, distribution, route planning, and operations.

Distributed systems have commonly been applied to a broad range of residential, industrial, and medical sensing applications. These applications generally provide security through either standard, well-known encrypted communication protocols (e.g. https) or through costly special purpose protocols and networks (e.g. specialized RF). For example, these applications generally use one or more sensors connected directly to an endpoint. The endpoint incorporates one or more communications interfaces (i.e., modalities for communicating over different communication channels) (e.g., wired Ethernet, 802.11, Bluetooth, cellular or other RF), which the endpoint uses to communicate either directly or indirectly (e.g., via the Internet) with a server. Consumers and controllers connect to the server though a broad range of devices (computers, personal digital assistants, smart phones, tablet computers, etc.) to access sensor data, perform analysis, and/or exert control over actuators. Standard Internet software systems, such as a web-server, allow these components to interact.

Network attacks have consistently demonstrated that encrypted communications are insufficient to protect critical infrastructure in the presence of a determined adversary. A plethora of attack vectors have evolved to subvert the operation of a system, including but not limited to remote computer network attacks, insider attacks, supply chain attacks, side channel attacks, physical tampering attacks, and denial of service attacks. Although there are no absolute remedies to these threats, it is possible, by conscious organization, to substantially reduce the level of vulnerability and increase the difficulty and time associated with system compromises.

In some systems, there are distinct zones of trust to protect within a distributed sensing and control system. These zones can include the endpoints, the servers that provide storage, analysis, and control, and the consumer of sensor data or controller of actuators (henceforth referred to as a "user"). Irrespective of whether the server and the user are co-located or distributed, these zones inevitably contain sensitive personal or organization information (i.e., "private data") that cannot be openly divulged during operation of the system. This concern is particularly prevalent in systems that involve medical data where compliance regulations, such as Health Insurance Portability and Accountability Act ("HIPAA") compliance regulations, increase privacy concerns. However, protection of private data is also important in supervisor control and data acquisition ("SCADA") control systems used to control industrial plants, remote monitoring applications for homes and heating, ventilating, air and conditioning ("HVAC"), and numerous other systems.

Accordingly, embodiments of the invention provide an endpoint used in a distributed sensing and control system, such as the sensing and control system described in U.S. Pat. No. 7,333,921. The endpoint provides scalability through lockless sensing and control. In particular, each field device is attached directly to an endpoint, which is associated with a unique identifier. The unique identifier is used at a server to associate the field device (and associated endpoint) with a single-writer thread used to write data (e.g., sensor data) to a file associated with the field device. This functionality allows the server to automatically record data in a file without serialization, mutual exclusion, or locking. Conversely, for control, the endpoint acts as a single-writer thread for one or more actuators connected to the endpoint. Using a single-writer thread removes overhead for recording data, providing control, and providing scalable high efficient operations. In some embodiments, if multiple sensors and actuators are attached to the endpoint, the unique identifier is constructed in a manner that uniquely distinguishes each field device connected to the endpoint.

The endpoint also provides security. In particular, the endpoint and the system including the endpoint consciously enforce data separations such that associations between the endpoint, the endpoint's physical location, mappings between the endpoint and a user, and the private information associated with users are each isolated within distinct trust zones. For example, endpoints can be anonymous to the remainder of the system and can protect their physical location, their sensor data, and their unique identifier by never transmitting any of these characteristics outside their hardware boundary in unencrypted form (i.e., tunneling encryption), even when encrypted channels are in use. For example, the endpoint can encrypt these attributes (e.g., with or without packing) within the trusted boundary and then can pass the encrypted result off to be further encrypted by communication protocols.

Similarly, by enforcing specific forms of interaction within the system, private data associated with users is never transmitted outside a trust zone of the user. In particular, an association between an anonymous user and an anonymous endpoint can exist only within the trusted boundary of the server. For example, even in the presence of encrypted communications, these associations are never transmitted on the same communication channel, which isolates the zones of trust. In particular, a user cannot determine the location or status of an endpoint and even if authorized and malicious access is gained on an endpoint, the endpoint provides no information that allows access to private data owned by users.

For example, in some embodiments, endpoint functionality, including encryption, communication, and sensor interfacing, is performed within a single system-on-a-chip device included in the endpoint. The physical boundary of this system-on-a-chip device establishes a "protected boundary" of the endpoint. Placing endpoint functionality within the protected boundary makes interception of endpoint information impossible without either breaking both the communication encryption and the tunneling encryption or dismantling the device with exotic techniques such as acid etching. The chip device itself can also use its sensor interfaces to obtain tampering information to combat dismantling techniques. Moreover, the endpoint can include trusted bootstrapping hardware that allows the extension of the hardware root of trust at the endpoint to be expanded into software algorithms for data analytics at the endpoint. Also, in some embodiments, the endpoint can include field-programmable gate array ("FPGA") hardware on the chip device to perform hidden monitoring for malicious implants within the endpoint.

The endpoint also provides resilience. For example, by providing multiple hardware instances at an endpoint, multiple communication interfaces at an endpoint, and multiple copies of a server, an endpoint can maintain operation in the presence of faults, errors, and computer network attacks. In some embodiments, the particular communication interface used by an endpoint can be based on channel properties associated with communications (such as availability, signal strength, signal-to-noise ratio, interference, drop rate, temporal profiles, historical profiles, etc.) or can be based on a non-deterministic (i.e., unpredictable) access pattern (e.g., to increase attacker workload).

The endpoint also provides logistical support. Traditional logistics support is intended to optimize supply, delivery, route planning, and operations. However, these approaches fail to protect the location of the sensor, fail to provide anonymity for either the endpoint or the server, and fail to protect private data associated with the end user as described above. Traditional logistical support also fails to handle a mixed population in which only a subset of end users have endpoints and erratic behavior or complete failure of a sensor, endpoint, or communications channel.

In one embodiment, the system described herein handles mixed populations by combining industry standard estimation techniques (for example, including but not limited to regression analysis and degree-day estimation) with estimates based on measurements at the endpoint and analytics at the server. Similarly, the system described herein can handle erratic behavior and failures through rollover techniques at the endpoint and/or historical data maintained either at the server or with the user.

In particular, one embodiment of the invention provides an endpoint. The endpoint includes one or more connections to a plurality of field devices. The field devices can include sensors configured to (e.g., concurrently) collect and transmit sensor data and actuators for controlling an individual plant, storage vessels, medical devices, etc. The endpoint can include a single chip and the physical boundary of the chip can establish a protective boundary of the endpoint (e.g., ensuring that a physical attack must penetrate a chip boundary).

The endpoint includes a unique identifier isolated within (e.g., stored and retained within) a protected boundary of the endpoint. The unique identifier associates the endpoint with a single-writer thread at a server and one or more reader, analysis, and control threads (collectively referred to herein as "output threads") at the server. The endpoint also includes encryption capabilities within the protected boundary of the endpoint. In addition, the endpoint includes a plurality of communication interfaces (e.g., with different capabilities and modalities). The endpoint is configured to consciously omit unencrypted transmission of the unique identifier and sensor data outside the protected boundary of the endpoint, including over encrypted communication channels. For example, the endpoint can encrypt these attributes (e.g., with or without packing) within the trusted boundary and then pass the encrypted result off to be further encrypted by communication protocols. In other words, the endpoint is configured to not transmit the unique identifier outside of the protected boundary endpoint in unencrypted form, even when transmitting data over an encrypted communication channel. The endpoint is also configured to consciously omit, within the endpoint, any association between the unique identifier and private information associated with reader, analysis, and control threads at the server or elsewhere. In addition, the endpoint is configured to consciously omit from any communication to or from the endpoint any association between the unique identifier and the private information (i.e., does not transmit or receive any transmission that associates the unique identifier with private information). An agreement is established between the endpoint and the server to guarantee conscious omission of the unique identifier from all communication not conducted (e.g., directly) with the endpoint. In other words, the association between the unique identifier and the endpoint is known only to the server.

The endpoint can be operated under a battery power supply, an electrical power supply, or a combination thereof. In some embodiments, the endpoint is also configured to conduct an internal analysis of sensor data received from the devices communicating with the endpoint (e.g., to reduce errors and improve accuracy). The endpoint can also be configured to provide protected software bootstrapping using hardware capabilities. Furthermore, in some embodiments, the endpoint is configured to dynamically obtain configuration data, including but not limited to software, firmware, and FPGA configurations, over the network. The endpoint can also be configured to perform analytics and leverage compression techniques to reduce the volume of communication transmitted to the server. In some embodiments, the endpoint is also configured to communicate with multiple servers (e.g., to provide rollover protection against failures, errors, and computer network attacks).

The communication interfaces included in the endpoint can include but are not limited to 802.11, 802.15, cellular, and wired Ethernet. The endpoint can use the communication interfaces to communicate directly to the server or indirectly to the server (e.g., via intermediate relay devices). Also, in some embodiments, the endpoint includes multiple instances of the same communication interface (e.g., multiple copies of individual communication modalities) (e.g., to allow alternative data exfiltration paths).

One or more of the sensors communicating with the endpoint can include hidden hardware to monitor against (e.g., detect and/or prevent) malicious attacks (e.g., within the protection boundary of the endpoint), faults, and other sources of aberrant system behavior. One or more of the sensors can also include hidden hardware to monitor against (e.g., detect and/or prevent) physical tampering with or within the protection boundary of the endpoint.

In some embodiments, one or more of the sensors communicating with the endpoint can include ranging sensors configured to determine a level of material within a container (e.g., a vessel or a tank) including but not limited to gas, oil, water, and an agricultural produce. For example, one or more of the sensors communicating with the endpoint can include a potentiometer attached to a mechanical level indicator and/or an ultrasonic range sensor inserted into an orifice of a container. Similarly, one or more of the actuators communicating with the endpoint can include a shutoff valve to control a level of material within a container (e.g., a vessel or a tank).

In other embodiments, one or more of the sensors communicating with the endpoint can include a flow sensor, pressure sensor, vibration sensor, temperature sensor, optical sensor, or a combination thereof for determining a status of an industrial plant. Similarly, one or more of the plurality of actuators communicating with the endpoint can include a switch, a valve, a hydraulic piston, or a combination thereof for controlling the industrial plant. The industrial plant can be configured for electrical power production, chemical and biological processes, and sewage, waste, or water treatment.

In other embodiments, one or more of the sensors communicating with the endpoint can include medical sensors that monitor medical sensor data or data associated with medical devices, practitioners, or health care processes. Similarly, one or more actuators communicating with the endpoint can include medical actuators used to control medical equipment or health care processes.

The endpoint can also be configured to trigger alerts and warnings (collectively referred to as communications) to analysis and control threads at the server. In addition, the endpoint can be configured to ignore communications from unauthentic servers. The endpoint can also be configured to determine a communication interface to use at a particular time based on communication channel properties, such as availability, signal strength, etc. In some embodiments, the endpoint is configured to make this determination in a non-deterministic manner, such as using a non-deterministic algorithm (e.g., to increase attacker workload).

In some embodiments, the endpoint can be used in a sensing and control system as described in U.S. Pat. No. 7,333,921, which is incorporated herein by reference. In this configuration, the endpoint, the server, or a combination thereof provides secure and resilient logistical support by combining sensor measurements, historical data, industry standard predictive methods, and analytics to optimize supply, distribution, delivery route planning, and operations. Also, in some embodiments, quantity information and timestamp information (e.g., from containers) is combined with analytics (e.g., at the server) to produce a burn rate estimate, a flow rate estimate, or both, which can be used to predict a time-to-expenditure. For example, quantity information and flow rate information can be combined with historical values to cope with sensor, end-point, communication, and security failures. Similarly, quantity information and flow rate information can be combined with industry standard estimation techniques (e.g., including but not limited to regression analysis and degree-day calculations) to account for mixed populations of users, some of whom do not possess endpoints with associated sensors.

In some embodiments, the endpoint can be configured to hide its physical location (and the physical location of the field devices, such as sensors and actuators, communicating with the endpoint) by consciously omitting location data from communications to and from the endpoint. An agreement established between the endpoint and the server can ensure that the physical location of the endpoint and the associated field devices is consciously omitted from the server.

Other aspects of the invention will become apparent by consideration of the detailed description and accompanying drawings.

BRIEF DESCRIPTION OF THE DRAWINGS

FIG. 1A is a schematic block diagram of a distributed architecture according to one embodiment of the invention.

FIG. 1C is a schematic block diagram of a communication block included in the endpoint of FIG. 1B for communicating with a server or cluster of servers included in the distributed architecture of FIG. 1A.

DETAILED DESCRIPTION

Figure 1B:
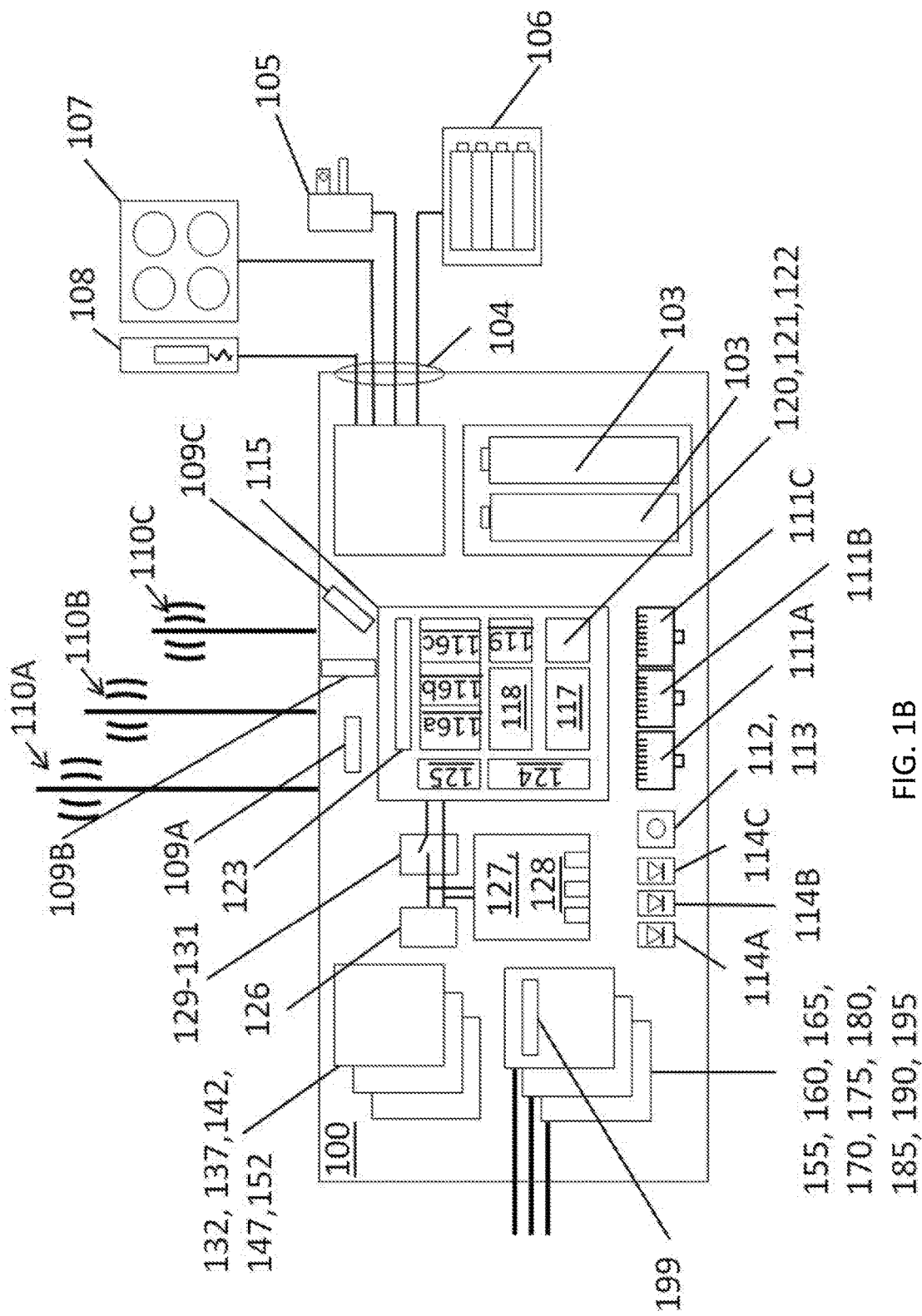
FIG. 1B is a schematic block diagram of an endpoint included in the distributed architecture of FIG. 1A.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. Furthermore, and as described in subsequent paragraphs, the specific configurations illustrated in the drawings are intended to exemplify embodiments of the invention, it being understood that other alternative configurations are possible.

In general terms, embodiments of the present invention are directed to a distributed sensing and control system architecture that employs hardware attributes and mechanisms to provide scalable, secure, resilient, and computationally efficient information transfers between field devices (e.g., sensors and actuators) and a server or a cluster of servers over a data communication channel (e.g., a network).

FIG. 1A is a schematic block diagram of a distributed architecture according to one embodiment of the invention. The system includes an endpoint 100. The endpoint 100 communicates with a remote server or cluster of servers 90 (referred to interchangeably as the "server 90" or "remote server 90") over one or more communication channels 101a-101c (collectively referred to as channels 101). In some embodiments, the remote server 90 uses the distributed sensing architecture and method described in U.S. Pat. No. 7,333,921. In particular, as illustrated in FIG. 1A, the remote server 90 can provide lockless data capture via single-writer threads 102a-102c (collectively referred to as threads 102). Although not illustrated in FIG. 1A, the endpoint 100 communicates with one or more field devices, which can include sensors collecting sensor data and actuators exerting control over one or more mechanisms, such as valves. In some embodiments, the sensors sense a level of material within a container and the actuators control one or more valves for controlling the amount of material within the container.

As illustrated in FIG. 1B, the endpoint 100 can be powered internally by batteries 103, which may be rechargeable, by one or more external power sources 104, or by a combination of both. If the batteries 103 include rechargeable batteries, the batteries 103 can be recharged when power is available from the external power sources 104. However, if power is not available from the external power sources 104, the batteries 103 can provide power to continue operation of the endpoint 100. The external power sources 104 can include alternating current ("AC") or direct current ("DC") sources converted from utility mains 105, external battery packs 106, renewable sources such as solar panels 107, and/or harvested sources, such as motion-based energy capture systems 108.

The endpoint 100 includes one or more communication interfaces. As illustrated in FIG. 1B, the communication interfaces can include zero or more internal antennas 109a-109c (collectively referred to as antennas 109), zero or more external antennas 110a-110c (collectively referred to as antennas 110), and zero or more wired network interfaces 111a-111c (collectively referred to as interfaces 111). As described below, the endpoint 100 uses the communication interfaces to communicate with the remote server 90 and, in some embodiments, the field devices.

In some embodiments, the endpoint 100 includes one or more input mechanisms, such as a button 112 and/or a jumper 113, for receiving user input. The user input can be used for calibration purposes or for changing a mode of the endpoint 100 between a configuration or calibration mode and a normal operation mode. In some embodiments, the user input may also be used to verify the physical presence of an authenticated operator when performing high risk operations, such as updating flash or FPGA definitions. In some embodiments, the endpoint 100 also incorporates one or more light-emitting diodes ("LEDs") 114a-114c (collectively referred to as LEDs 114) to visually indicate a state or mode of the endpoint 100. It should be understood that other types of output or display devices can be used to provide visual information regarding the endpoint 100 as an alternative to or in addition to the LEDs 114.

The endpoint 100 includes a system-on-chip device 115 that includes one or more electronic processors performing the functionality described herein. In some embodiments, the one or more electronic processors include zero or more processing cores 116a-116c (collectively referred to as processing cores 116) and zero or more programmable logic blocks 117 (e.g., field programmable gate arrays ("FPGAs")) located within the physical chip boundary of the system-on-chip device 115. The endpoint 100 also contains on-chip memory 118 located within the physical chip boundary of the system-on-chip device 115. In some embodiments, the physical chip boundary of the system-on-chip device 115 establishes a protective boundary for the endpoint 100. It should be understood that the functionality performed by the endpoints described herein may be implemented by code (i.e., instructions) executed by zero or more processing cores, hardware configurations of the zero or more programmable logic blocks, or a combination thereof. For example, as described in more detail below, an endpoint may implement hidden monitors using one or more programmable logic blocks but may implement bootstrapping using code running on one or more processing cores. However, it should be understood that, in some embodiments, functionality described herein as being performed by a processing core may be performed by a programmable logic block or vice versa. Similarly, in general, the functionality described herein may be performed by one or more processing cores, one or more programmable logic blocks, or a combination thereof.

The endpoint 100 contains hardware or FPGA-based cryptographic components 119 located within the physical chip boundary of the system-on-chip device 115. Keys 120, signatures/certificates 121, and other secret data 122 used for endpoint authentication and encryption processes are stored within the physical chip boundary of the system-on-chip device 115. In particular, a globally unique endpoint identifier 123 is stored within the physical chip boundary of the system-on-chip device 115. The globally unique endpoint identifier 123 associates endpoint data with a server-side single-writer thread 102. The globally unique endpoint identifier 123 is consciously omitted from plain-text transmission beyond the physical chip boundary of the system-on-chip device 115. In particular, the cryptographic components 119 provide for secure transmission of the globally unique endpoint identifier 123 beyond the physical chip boundary of the system-on-chip device 115.

In some embodiments, the endpoint 100 includes a zero-stage boot loader 124 located within the physical chip boundary of the system-on-chip device 115. The zero-stage boot loader 124 is responsible for configuring the system-on-chip device 115 out of a reset. In some embodiments, the zero-stage boot loader 124 authenticates and decrypts an encrypted first-stage boot loader image 125 using the cryptographic components 119. The first-stage boot loader image 125 may be stored locally within the physical chip boundary of the system-on-chip device 115, externally in fixed non-volatile storage mechanisms 126, such as flash memory, or externally in removable non-volatile storage mechanisms 127, such as secure digital input output ("SDIO") flash media 128. When the first-stage boot loader image 125 is stored external to the boundary of the system-on-chip device 115, a physical means, such as a removable PCB component 129, jumper 130, or switch 131 can be provided for disabling write access to the storage mechanisms 126 and 127.

In some embodiments, as one of the communication interfaces for communicating with the remote server 90, the endpoint 100 includes a radio communications block 132 that provides radio frequency ("RF") communications using 802.11 specified frequencies and 802.11 specified communications protocols. As illustrated in FIG. 1C, the radio communications block 132 can include analog/RF signal processing 133 for one or more antennas 109, 110. Where more than one antenna is present, the radio communications block 132 can include RF/analog signal switching capabilities 134 for the purpose of antenna and frequency diversity. The radio communications block 132 can include baseband processing 135 and media access control 136 components as specified in the 802.11 standards. Sub-components of the radio communications block 132 can be located within the physical chip boundary of the system-on-chip device 115 or external to the physical chip boundary of the system-on-chip device 115. Data transmitted using the radio communications block 132 is consciously secured from unauthorized observation by encrypting the data using the cryptographic components 119.

In some embodiments, as one of the communication interfaces for communicating with the remote server 90, the endpoint 100 includes a radio communications block 137 that provides RF communications using 802.15 specified frequencies and 802.15.X communications protocols, including but not limited to Bluetooth 802.15.1 and ZigBee 802.15.4. As illustrated in FIG. 1C, the radio communications block 137 can include analog/RF signal processing 138 for one or more antennas 109, 110. Where more than one antenna is present, the radio communications block 137 can include RF/analog signal switching capabilities 139 for the purpose of antenna diversity. The radio communications block 137 can also include baseband processing 140 and media access control 141 components as specified in the 802.15.X standards. Sub-components of the radio communications block 137 can be located within the physical chip boundary of the system-on-chip device 115 or external to the physical chip boundary of the system-on-chip device 115. Data transmitted using the radio communications block 137 is consciously secured from unauthorized observation by encrypting the data using the cryptographic components 119.

In some embodiments, as one of the communication interfaces for communicating with the remote server 90, the endpoint 100 includes an industrial, scientific, and medical ("ISM")-band radio communications block 142 that provides RF communications using one or more ISM-band frequencies and proprietary communications protocols. As illustrated in FIG. 1C, the ISM-band radio communications block 142 can include analog/RF signal processing 143 for one or more antennas 109, 110. Where more than one antenna is present, the ISM-band radio communications block 142 can include RF/analog signal switching capabilities 144 for the purpose of frequency and antenna diversity. The ISM-band radio communications block 142 can also include baseband processing 145 and media access control 146. Sub-components of the ISM-band radio communications block 142 can be located within the physical chip boundary of the system-on-chip device 115 or external to the physical chip boundary of the system-on-chip device 115. Data transmitted using the ISM-band radio communications block 142 is consciously secured from unauthorized observation by encrypting the data using the cryptographic components 119.

In some embodiments, as one of the communication interfaces for communicating with the remote server 90, the endpoint 100 includes a radio communications block 147 that provides RF communications using one or more cellular global system for mobile communications ("GSM")-band frequencies and protocols. As illustrated in FIG. 1C, the radio communications block 147 can include analog/RF signal processing 148 for one or more antennas 109, 110. Where more than one antenna is present, the radio communications block 147 can include RF/analog signal switching capabilities 149 for the purpose of frequency and antenna diversity. The radio communications block 147 can also include baseband processing 150 and media access control 151. Sub-components of the radio communications block 147 can be located within the physical chip boundary of the system-on-chip device 115 or external to the physical chip boundary of the system-on-chip device 115. Data transmitted using the radio communications block 147 is consciously secured from unauthorized observation by encrypting the data using the cryptographic components 119.

In some embodiments, as one of the communication interfaces for communicating with the remote server 90, the endpoint 100 provides an Ethernet communications block 152 that provides wired communications using 802.3 specified electrical signaling and communications protocols. As illustrated in FIG. 1C, the Ethernet communications block 152 can include one or more physical layer interfaces 153 with associated media access controllers 154. Data transmitted using the Ethernet communications block 152 is consciously secured from unauthorized observation by encrypting the data using the cryptographic components 119.

It should be understood that the endpoint 100 can include one or more of the communications blocks 132, 137, 142, 147, and 152 described above. Also, it should be understood that the endpoint 100 can be configured to use one or more of the communications blocks 132, 137, 142, 147, and 152 to communicate with one or more field devices.

Figure 1D:
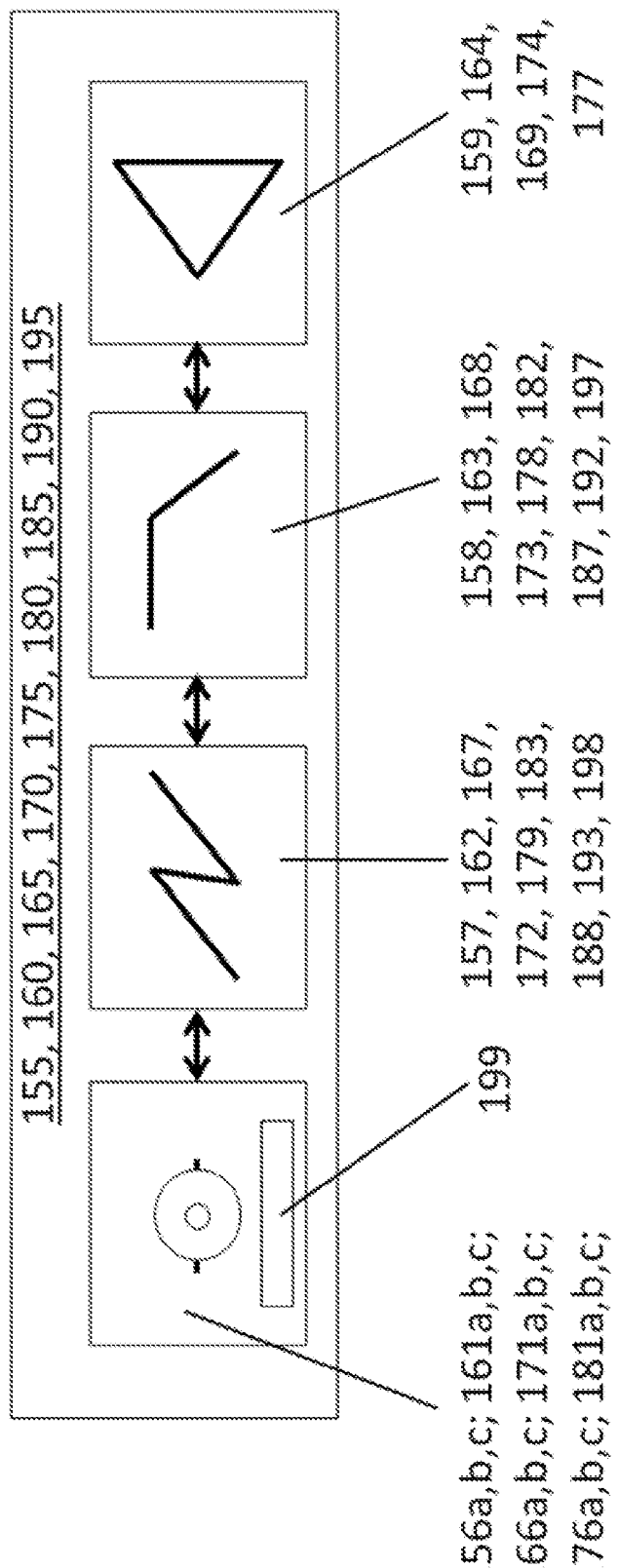
FIG. 1D is a schematic block diagram of a communication block included in the ending of FIG. 1B for communicating with a field device included in the distributed architecture of FIG. 1A.

In some embodiments, as one of the communication interfaces for communicating with one or more field devices, the endpoint 100 includes an analog voltage input block 155 that provides one or more analog voltage input channel 156a-156c (collectively referred to as the channels 156) (see FIG. 1D). The channels 156 can support voltage ranges between −10 volts and 10 volts and sub-ranges therein. As illustrated in FIG. 1D, the analog voltage input block 155 can include electrical protection 157, signal conditioning 158, and analog-to-digital conversion 159 components.

In some embodiments, as one of the communication interfaces for communicating with one or more field devices, the endpoint 100 includes an analog current input block 160 that provides one or more analog current input channels 161a-161c (collectively referred to as the channels 161) (see FIG. 1D). The channels 161 can support current ranges between 0 and 24 mA and sub-ranges therein. As illustrated in FIG. 1D, the analog current input block 160 can include electrical protection 162, signal conditioning 163, and analog-to-digital conversion 164 components.

In some embodiments, as one of the communication interfaces for communicating with one or more field devices, the endpoint 100 includes an analog voltage output block 165 that provides one or more analog voltage output channels 166a-166c (collectively referred to the channels 166) (see FIG. 1D). The channels 166 can support voltage ranges between −10 volts and 10 volts and sub-ranges therein. As illustrated in FIG. 1D, the analog voltage output block 165 can include digital-to-analog conversion 167, signal conditioning 168, and electrical protection 169 components.

In some embodiments, as one of the communication interfaces for communicating with one or more field devices, the endpoint 100 includes an analog current output block 170 that provides one or more analog current output channels 171a-171c (collectively referred to as the channels 171) (see FIG. 1D). The channels 171 can support current ranges between 0 and 24 mA and sub-ranges therein. As illustrated in FIG. 1D, the analog current output block 170 can include digital-to-analog conversion 172, signal conditioning 173, and electrical protection 174 components.

In some embodiments, as one of the communication interfaces for communicating with one or more field devices, the endpoint 100 includes a digital input block 175 that provides one or more digital input channels 176a-176c (collectively referred to as the channels 176) (see FIG. 1D). The channels 176 can support voltage inputs between −50 and 50 V and sub-ranges therein. In some embodiments, input voltages received on the channels 176 below specified one or more threshold voltages 177 are considered logic 0, and input voltages received on the channels 176 above one or more threshold voltages 177 are considered logic 1. As illustrated in FIG. 1D, the digital input block 175 can include signal conditioning 178 and electrical protection 179 components.

In some embodiments, as one of the communication interfaces for communicating with one or more field devices, the endpoint 100 includes a digital output block 180 that provides one or more switched output channels 181a-181c (collectively referred to as the channels 181) (see FIG. 1D). The channels 181 can support voltage ranges between −200 and 200 V and current ranges between −1 A and 1 A and sub-ranges therein. As illustrated in FIG. 1D, the digital output block 180 can include signal conditioning 182 and electrical protection 183 components.

In some embodiments, as one of the communication interfaces for communicating with one or more field devices, the endpoint 100 includes an RS232 input/output block 185 that provides one or more RS232 input/output channels 186a-186c (collectively referred to as the channels 186) (see FIG. 1D). The channels 186 can support RS232 (EIA232) standard serial communications. As illustrated in FIG. 1D, the RS232 input/output block 185 can include signal conditioning 187 and electrical protection 188 components.

In some embodiments, as one of the communication interfaces for communicating with one or more field devices, the endpoint 100 includes an RS485 input/output block 190 that provides one or more RS485 input/output channels 191a-191c (collectively referred to as the channels 191) (see FIG. 1D). The channels 191 can support RS485 (EIA/TIA-485) standard serial communications. As illustrated in FIG. 1D, the RS485 input/output block 190 can include signal conditioning 192 and electrical protection 193 components.

In some embodiments, as one of the communication interfaces for communicating with one or more field devices, the endpoint 100 includes a CANBUS input/output block 195 that provides one or more CANBUS 2.0A/B input/output channels 196a-196c (collectively referred to as the channels 196). The channels 196 can support the CANBUS 2.0A/B standard serial communications. As illustrated in FIG. 1D, the CANBUS input/output block 195 can include signal conditioning 197 and electrical protection 198 components.

In some embodiments, each channel 156, 161, 166, 171, 176, 181, 186, 191, 196 is associated with a channel identifier 199 that is unique within the context of the endpoint 100. The channel identifier 199 can be consciously omitted from plain text (i.e., unencrypted) transmission beyond the physical chip boundary of the system-on-chip device 115. In particular, the endpoint 100 can use the cryptographic components 119 to provide secure transmission of the channel identifier 199 beyond the physical chip boundary of the system-on-chip device 115. The combination of the globally unique endpoint identifier 123 of the endpoint 100 and the endpoint unique channel identifier 199 provides a globally unique identification of data transmitted or received by the channels 156, 161, 166, 171, 176, 181, 186, 191, and 196.

It should be understood that the endpoint 100 can include one or more of the channels 156, 161, 166, 171, 176, 181, 186, 191, and 196 described above. Also, it should be understood that, in some embodiments, the endpoint 100 can be configured to use one or more of the channels 156, 161, 166, 171, 176, 181, 186, 191, and 196 to communicate with one or more field devices.

In some embodiments, the cold-boot and/or reset process performed by the endpoint 100 uses hardware root-of-trust and boot-time chain-of-trust extension techniques. For example, out of a reset, the zero-stage boot loader 124 included in the endpoint 100 authenticates the first-stage boot loader image 125 stored in the storage mechanisms 126 and 127 using the cryptographic components 119 and keys 120, signatures/certificates 121, and other secret data 122. After the first-stage boot loader image 125 is authenticated, the first-stage boot loader image 125 is decrypted by the cryptographic components 119 and keys 120, signatures/ certificates 121, and other secret data 122 loaded into the on-chip memory 118 and, where present, the programmable logic blocks 117. The processing cores 116 then begin execution of the first-stage boot loader image 125.

In some embodiments, the endpoint 100 also includes a first-stage boot loader that configures one or more of the communications blocks 132, 137, 142, 147, and 152 and establishes one or more communications channels to the remote server 90. In particular, the first-stage boot loader can collect and analyze channel quality attributes (e.g., signal strength, signal-to-noise ratio, drop rate, etc.) to determine optimal channel configuration and utilization strategies. Once the first-stage boot loader selects a channel, two-way authentication is performed between the endpoint 100 and the remote server 90 (e.g., using the cryptographic components 119 and keys 120, signatures/certificates 121, and other secret data 122).

After authentication is complete, secure communication is performed over the selected channel (e.g., using one-time secrets and keys negotiated during the authentication process). The first-stage boot loader can also download an application image from the remote server 90. The endpoint 100 then enters a normal operation mode and begins execution of the downloaded application image.

In some embodiments, the two-way authentication and secure channel selection and establishment is periodically refreshed during normal operation of the endpoint 100. Also, in some embodiments, the downloaded application image is periodically refreshed from the remote server 90 during normal operation of the endpoint 100.

In addition, in some embodiments, communication channel quality attributes are periodically or continuously analyzed to achieve application communication requirements. Also, in some embodiments, the selected communication channel is periodically or continuously changed to increase non-deterministic behavior of the endpoint 100, which decreases vulnerability of the endpoint 100 to security compromises.

In some embodiments, the software algorithms and hardware resources contained within the boundary of the system-on-chip device 115 provide internal analysis of data including but not limited to analyzing data formats, data checksums, data lengths, and data whitelisting/blacklisting using data integrity techniques and filtering techniques including but not limited to dictionary matches and fuzzy logic keyword matches. The results of such analysis techniques can be used to terminate, modify, or augment the flow of information into or out of the endpoint.

In some embodiments, the software algorithms and hardware resources contained within the boundary of the system-on-chip device 115 provide plain-text data compression prior to encryption to reduce communication volume.

In some embodiments, the hardware resources within the boundary of the system-on-chip device 115 provide Federal Information Processing Standards ("FIPS") certified true random number generation for use in seeding cryptographic algorithms and to increase entropy in data streams prior to encryption.

In some embodiments, message structures used by the endpoint 100 are restricted to fixed formats and lengths to provide fixed-size checking attributes associated with all message transfers. The uniform packet structures can also include randomization fields that promote encryption diversity.

In some embodiments, the endpoint 100 includes hardware monitors, hidden in the programmable logic blocks 117, associated with the first-stage boot loader. These hardware monitors provide run-time integrity monitoring and alerts during execution of the first-stage bootloader. These monitors can be configured to provide alerts locally (e.g., via the channels 156, 161, 166, 171, 176, 181, 186, 191, and 196), remotely (e.g., over the communications blocks 132, 137, 142, 147, and 152) to the remote server 90, or a combination thereof. These monitors can also be configured to generate a system halt, a lockout, and/or a reset.

In some embodiments, the endpoint 100 includes hardware monitors, hidden in the programmable logic blocks 117, associated with the runtime application. These monitors can provide run-time integrity monitoring and alerts during execution of the first-stage bootloader. These monitors can be configured to provide alerts locally (e.g., via the channels 156, 161, 166, 171, 176, 181, 186, 191, and 196), remotely (e.g., over the communications blocks 132, 137, 142, 147, and 152) to the remote server 90, or a combination thereof. These monitors can also be configured to generate a system halt, a lockout, and/or a reset.

In some embodiments, the endpoint 100 includes hardware monitors to detect physical tampering activities using electrical, chemical, and inertial sensing techniques. These monitors can provide run-time integrity monitoring and alerts during execution of the first-stage boot loader. These monitors can be configured to provide alerts locally (e.g., via the channels 156, 161, 166, 171, 176, 181, 186, 191 and 196), remotely (e.g., over the communications blocks 132, 137, 142, 147, and 152) to the remote server 90, or a combination thereof. These monitors can also be configured to generate a system halt, a lockout, and/or a reset.

In some embodiments, software algorithms and hardware resources within the boundary of the system-on-chip device 115 provide for early rejection of invalid and/or malicious communication attempts. These techniques can include, but are not limited to, hardware and low-level software access control lists, hardware accelerated communication packet authentication and validation techniques independent of session authentication and encryption, rate-based throttling and rejection techniques, and traffic behavioral analysis.

Figure 2:
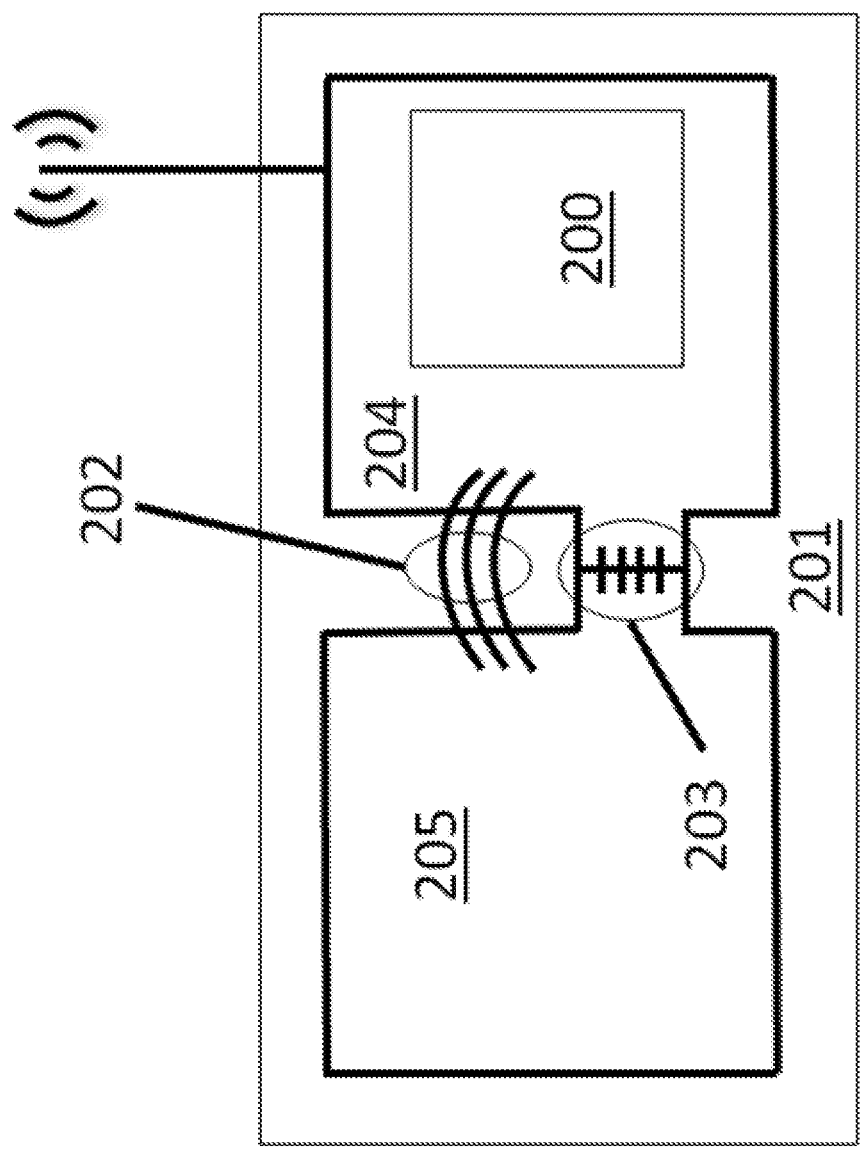
FIG. 2 is a schematic block diagram of one embodiment of an endpoint where the endpoint is co-located with a housing of a field device.

FIG. 2 is a schematic block diagram of one embodiment of an endpoint in which the endpoint 200 is co-located with the field device housing 201. The endpoint 200 communicates with one or more field devices using an electrical transmission medium, such as wires 202, PCB-to-PCB connectors 203, or co-location of endpoint electronics 204 and field device 205 on a common PCB.

Figure 3:
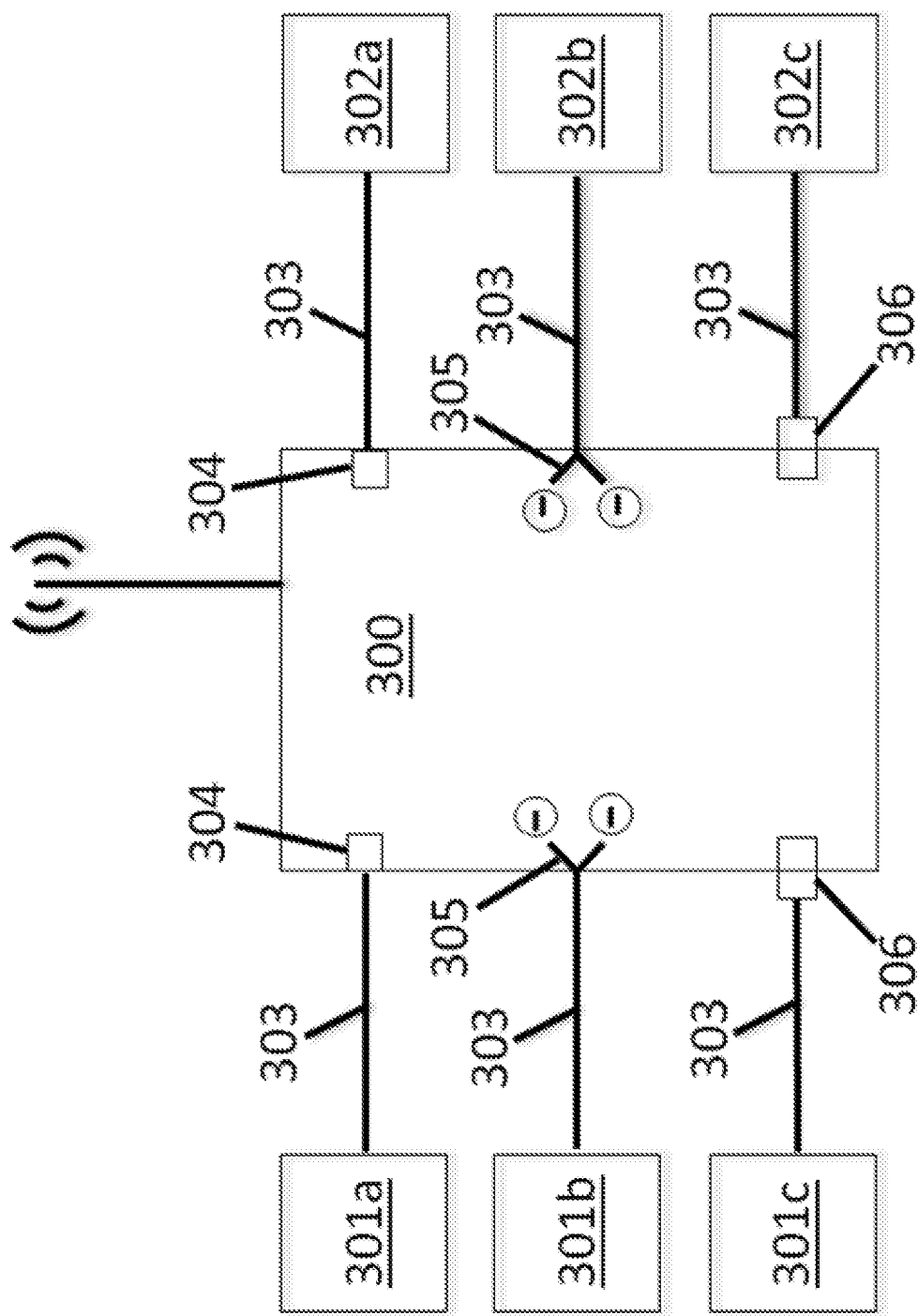
FIG. 3 is a schematic block diagram of one embodiment of an endpoint where the endpoint communicates with zero or more sensors and zero or more actuators.

FIG. 3 is a schematic block diagram of one embodiment of an endpoint in which the endpoint 300 communicates with zero or more sensors 301*a*-301*c* (collectively referred to as sensors 301) and zero or more actuators 302*a*-302*c* (collectively referred to as actuators 302) by means of an electrical transmission medium, such as one or more cables 303. The cables 303 can be hard-wired to terminals 304 of the endpoint 300, attached by screw terminals 305, or attached by plugs 306.

Figure 4:
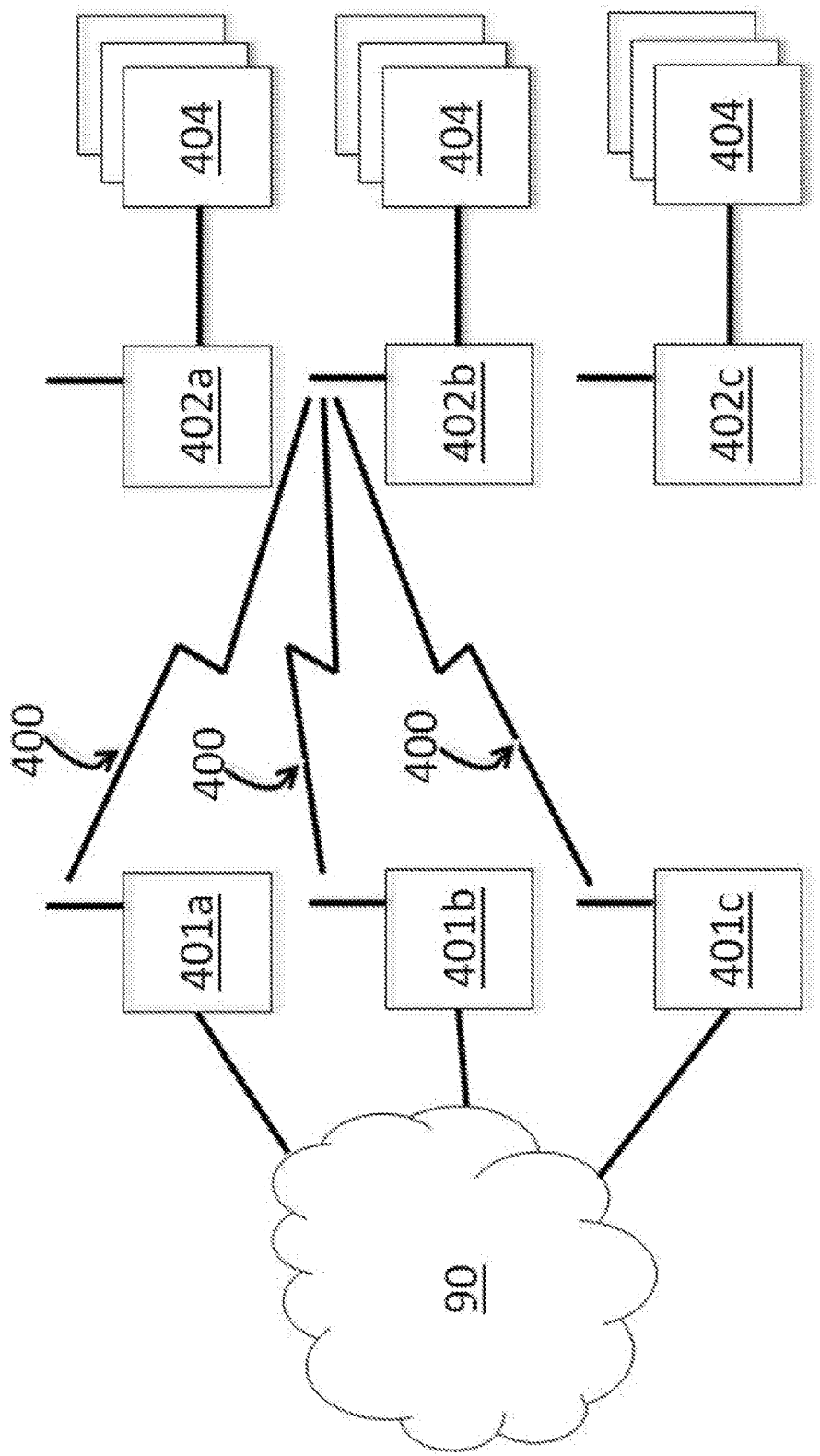
FIG. 4 is a schematic block diagram of one embodiment of an endpoint where two or more endpoints facilitate communication with a server.

FIG. 4 is a schematic block diagram of one embodiment of an endpoint in which two or more endpoints facilitate electrical transmission over radio channels 400 between one or more endpoints acting as access end-points 401a-401c (collectively referred to as access endpoints 401) and one or more end-points acting as node end-points 402a-402c (collectively referred to as node endpoints 402). The access endpoints 401 communicate with the remote server 90, and the node endpoints 402 communicate with the field devices 404 (see FIGS. 2 and 3).

Figure 5:
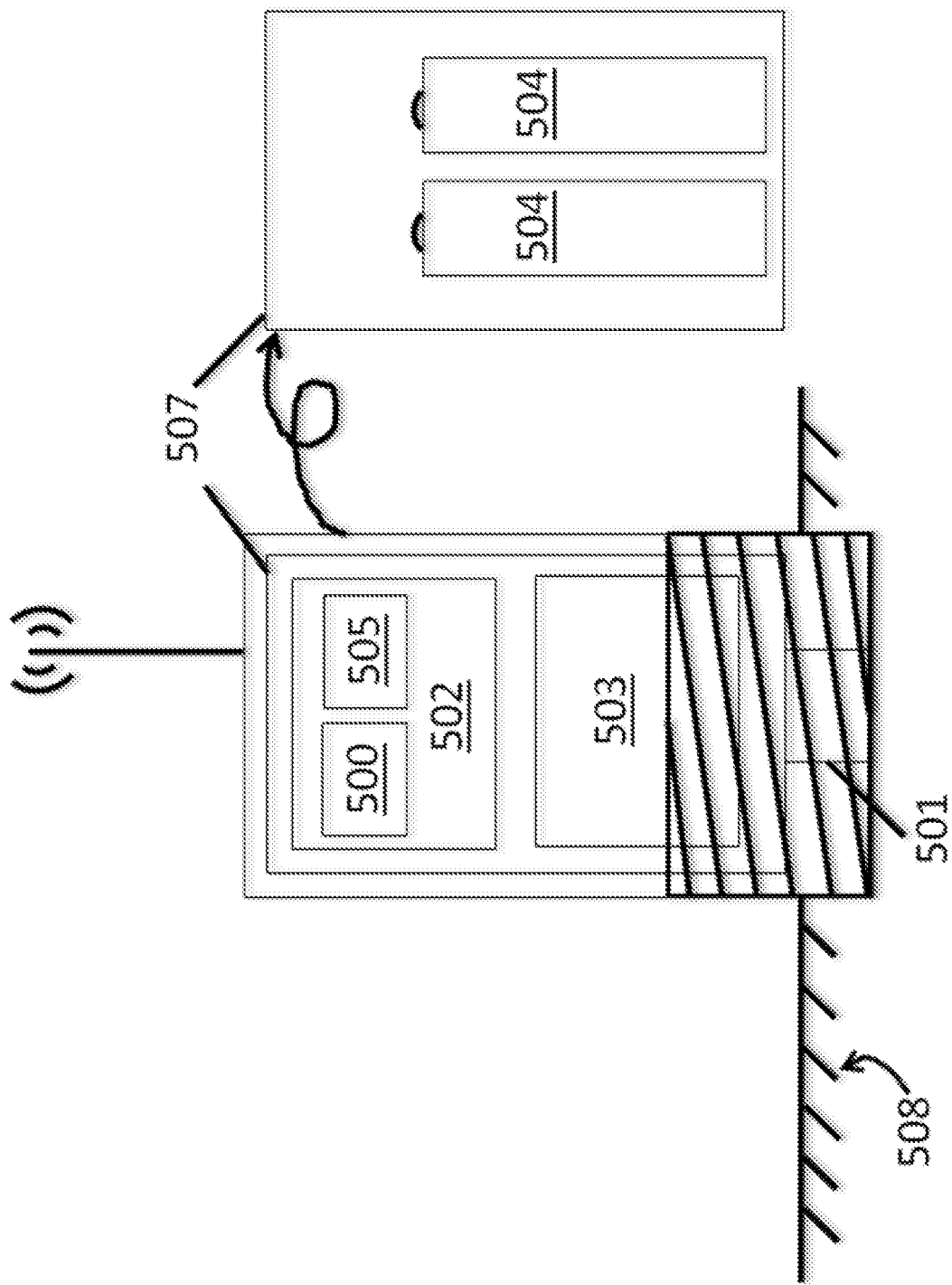
FIG. 5 is a schematic block diagram of one embodiment of an endpoint where the endpoint is co-located with an ultrasonic range finder and communicates with a server using an 802.11 radio interface.

FIG. 5 is a schematic block diagram of one embodiment of an endpoint in which an endpoint 500 is co-located with an ultrasonic range finder 501. Electronics 502 of the endpoint 500 and electronics 503 of the ultrasonic range finder 501 can be co-located on a common PCB 507. The endpoint 500 can be powered by field-serviceable batteries 504. The endpoint 500 can communicate with the remote server 90 using an 802.11 radio 505. In some embodiments, the ultrasonic range finder 501 is threaded into fittings (e.g., National Pipe Thread ("NPT") female fittings) commonly found on fluid storage containers 508.

Figure 6:
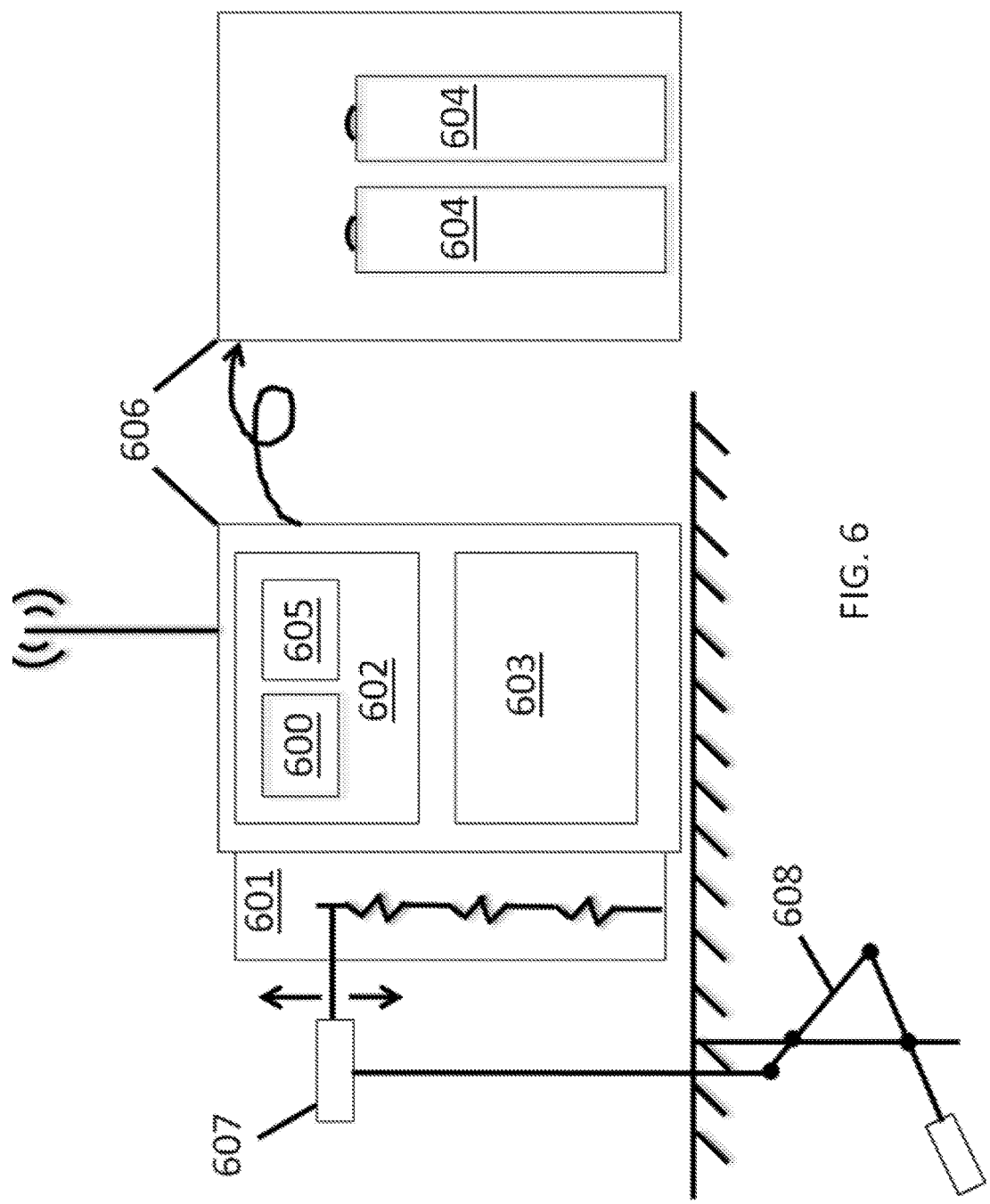
FIG. 6 is a schematic block diagram of one embodiment of an endpoint where the endpoint is co-located with a linear potentiometer and communicates with a server using an 802.11 radio interface.

FIG. 6 is a schematic block diagram of one embodiment of an endpoint in which an endpoint 600 is co-located with a linear potentiometer 601. Electronics 602 of the endpoint 600 and electronics 603 of the linear potentiometer 601 can be co-located on a common PCB 606. The endpoint 600 can be powered by field-serviceable batteries 604. The endpoint 600 can communicate with the remote server 90 using an 802.11 radio 605. In some embodiments, the linear potentiometer 601 is fitted to one or more tank level indicators 607, such as one or more linear displacement display gauges, frequently employed in mechanical tank fluid level measurement systems 608.

Figure 7:
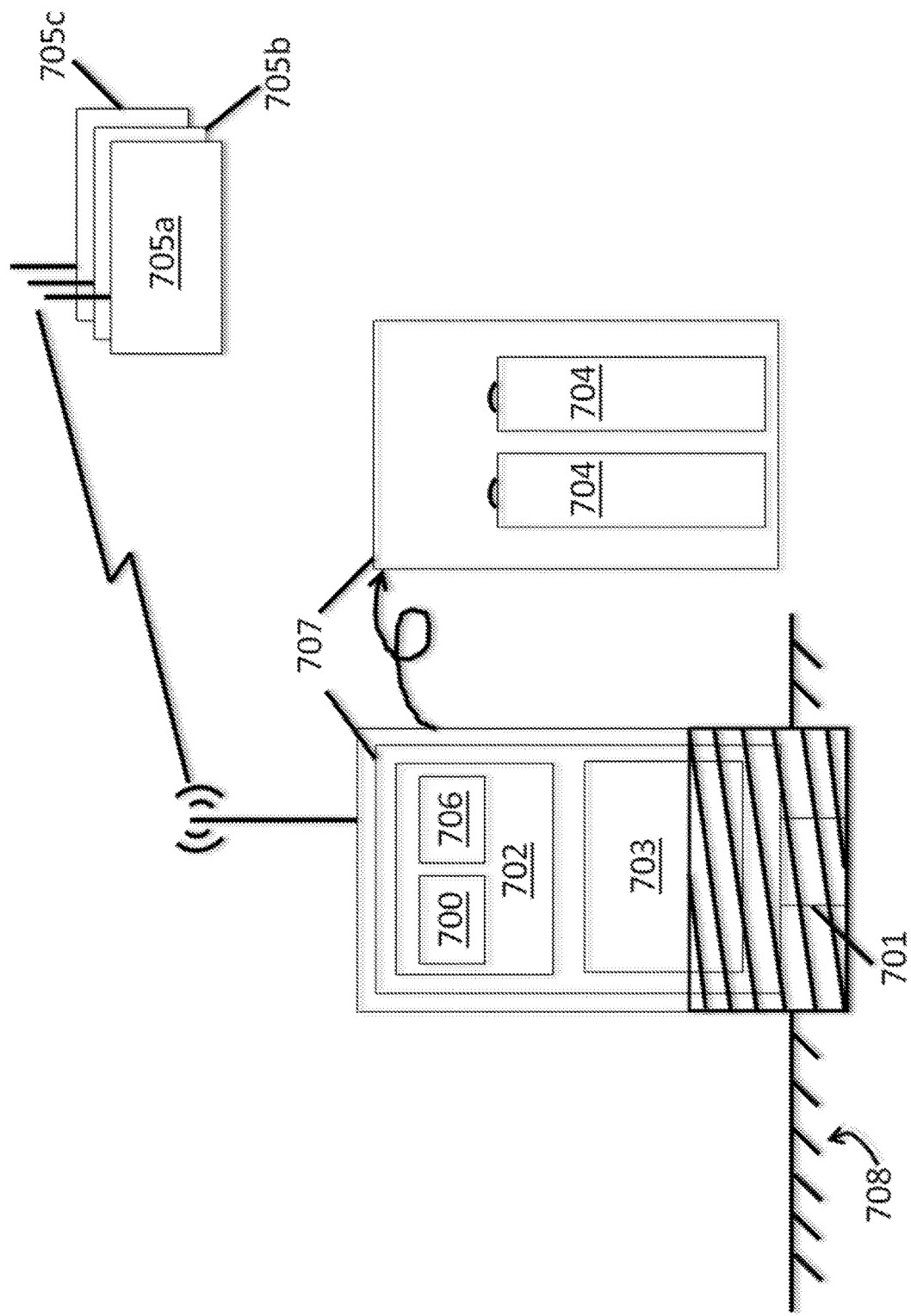
FIG. 7 is a schematic block diagram of one embodiment of an endpoint where an endpoint is co-located with an ultrasonic range finder and communicates with a server using intermediate endpoints.

FIG. 7 is a schematic block diagram of one embodiment of an endpoint in which an endpoint 700 is co-located with an ultrasonic range finder 701. Electronics 702 of the endpoint 700 and electronics 703 of the ultrasonic range finder 701 can be co-located on a common PCB 707. The endpoint 700 can be powered by field-serviceable batteries 704. The endpoint 700 can communicate with one or more remote access or intermediate endpoints 705a-705c (collectively referred to as endpoints 705) over an RF communication block 706. The endpoints 705 communicate with the endpoint 700 and the remote server 90 (i.e., allow the endpoint 700 to communicate with the remote server 90). In some embodiments, the ultrasonic range finder 701 is threaded into fittings (e.g., standard NPT-female fittings) commonly found on fluid storage containers 708.

Figure 8:
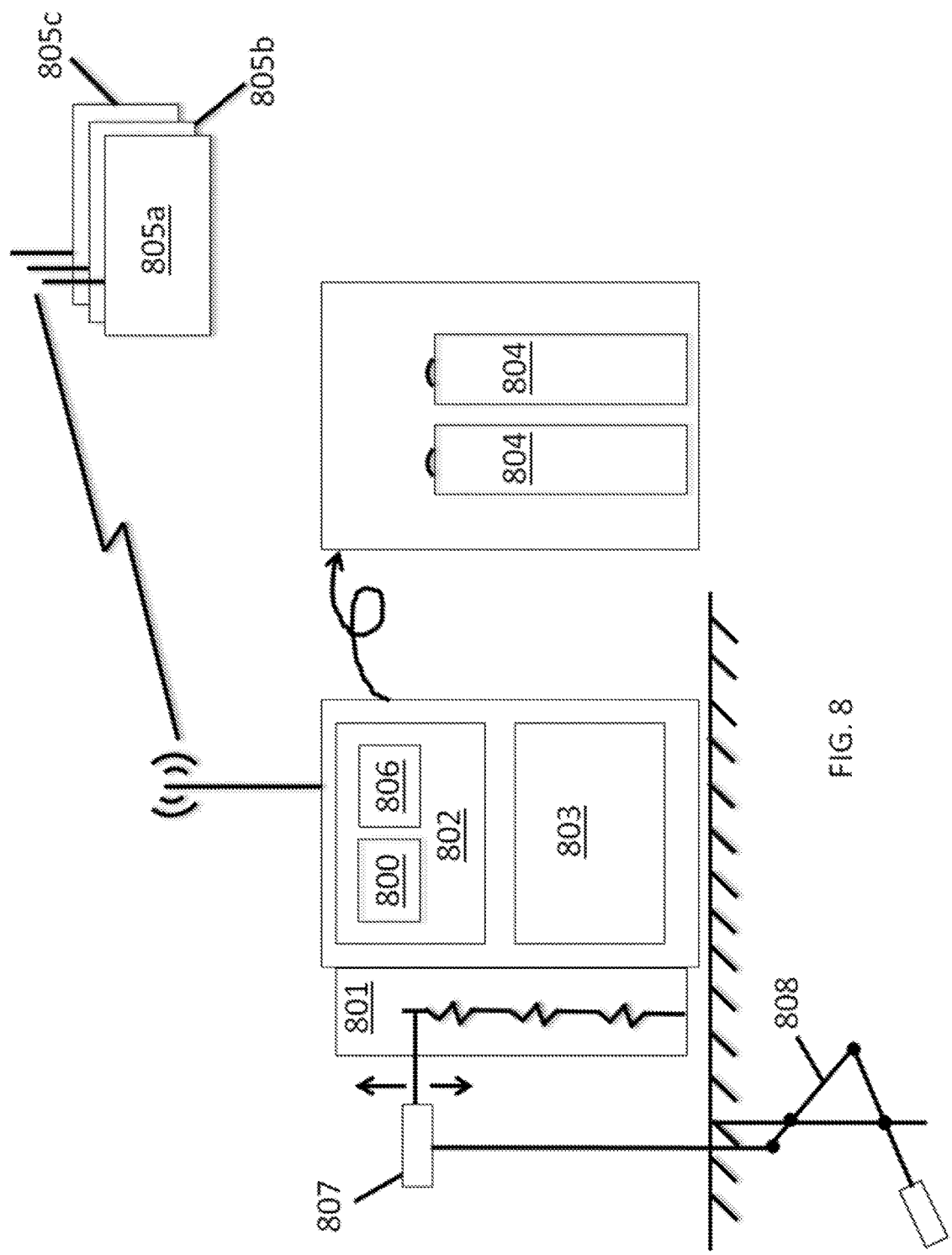
FIG. 8 is a schematic block diagram of one embodiment of an endpoint where an endpoint is co-located with a linear potentiometer and communicates with a server using intermediate endpoints.

FIG. 8 is a schematic block diagram of one embodiment of an endpoint in which an endpoint 800 is co-located with a linear potentiometer 801. Electronics 802 of the endpoint 800 and electronics 803 of the linear potentiometer 801 can be co-located on a common PCB. The endpoint 800 can be powered by field-serviceable batteries 804. The endpoint 800 can communicate with one or more remote access or intermediate endpoints 805a-805c (collectively referred to as endpoints 805) over an RF communication block 806. The endpoints 805 communicate with the endpoint 800 and the remote server 90 (i.e., allow the endpoint 800 to communicate with the remote server 90). In some embodiments, the linear potentiometer 801 is fitted to linear displacement display gauges 807 frequently employed in mechanical tank fluid level measurement systems 808.

It should be understood that the endpoints 200, 300, 401, 402, 500, 600, 700, and 800 illustrated in FIGS. 2-8 can include similar components to the endpoint 100 described above and illustrated in FIGS. 1B-1D.

In the embodiments of FIGS. 6 and 8, the device including the endpoint 600 or 800 can be calibrated after installation. For example, the device including the endpoint 600 can be attached to an existing tank level indicator 607. In particular, the linear potentiometer 601 can be affixed to the tank level indicator 607. A user can then operate an input mechanism, such as the button 112 or jumper 113, to place the device into a calibration mode. The tank level indicator 607 can then be placed into a minimum or maximum tank level (e.g., by pressing down or pulling up on the tank level indicator 607). The user can then operate an input mechanism, such as the button 112 or jumper 113, to indicate that the tank level indicator 607 is at the minimum or maximum level. The user than places the tank level indicator 607 in the opposite level (e.g., if initially placed at the maximum level, subsequently place the tank level indicator 607 at the minimum level) (e.g., by pressing down or pulling up on the tank level indicator 607). The user can then operate an input mechanism, such as the button 112 or jumper 113, to indicate that the tank level indicator 607 is at the opposite level. The user can then operate an input mechanism, such as the button 112 or jumper 113 to place the device into a normal operation mode (e.g., a sensing mode where the linear potentiometer 601 senses the position of the tank level indicator 607 and the endpoint 600 communicates this sensor data to the remote server 90). In some embodiments, the user can confirm the calibration by mechanically displacing the tank level indicator 607 and confirming that the tank level sensed by the device and the tank level reported by the tank level indicator 607 agree. The user can repeat calibration as necessary.

Thus, embodiments of the invention provide an endpoint for use in a distributed sensing and control system. The endpoint communicates with a remote server or cluster of servers and one or more field devices (e.g., sensors and/or actuators). The endpoint includes a system-on-a-chip device. The physical boundary of the system-on-a-chip device defines a protected boundary of the endpoint. A unique identifier for the endpoint (i.e., that uniquely identifies the endpoint and a particular field device communicating with the endpoint) is stored within the protected boundary. Encryption components included within the protected boundary encrypt the unique identifier anytime the unique identifier is transmitted outside of the protected boundary (even if the transmission occurs over an encrypted communication channel). Data relating to the field devices communicating with the endpoint can also be encrypted prior to transmission. The endpoint can include one or more communication interfaces for communicating with the remote server or cluster of servers. The endpoint can be configured to automatically identify a communication interface to use for communicating with the remote server or cluster of servers based on channel attributes and non-deterministic algorithms (e.g., to increase security). The endpoint can also include hardware components for performing protected software bootstrapping.

Various features and advantages of the invention are set forth in the following claims.

What is claimed is:

1. An endpoint comprising:
   a connection to a field device;
   a communication interface for communicating with a remote server;
   a single-chip device defining a protected boundary of the endpoint co-incident with a boundary of the single-chip device;
   an electronic processor located within the protected boundary of the endpoint;
   memory located within the protected boundary of the endpoint, the memory storing a unique identifier associated with a single-writer thread at the remote server writing data associated with the field device and an output thread at the remote server; and a cryptographic hardware component located within the protected boundary, wherein the electronic processor is configured to encrypt the unique identifier and data associated with the field device with the cryptographic hardware component for transmission outside the protected boundary over the communication interface even when the communication interface employs an encryption protocol and to explicitly omit unencrypted transmission of the unique identifier and the data outside the protected boundary, wherein the output thread is associated with private data, wherein the endpoint does not include an association between the unique identifier and the private data, wherein the endpoint and the remote server explicitly omit the association between the unique identifier and the private data from any communication with the endpoint, wherein the endpoint and the remote server explicitly omit the unique identifier from any communications not with the endpoint.

2. The endpoint of claim 1, further comprising a power supply including at least one selected from the group consisting of a battery power supply and an electrical power supply.

3. The endpoint of claim 1, wherein the data associated with the field device includes sensor data and wherein the electronic processor is further configured to conduct an internal analysis of the sensor data.

4. The endpoint of claim 1, further comprising a boot loader located within the protected boundary including hardware providing protected software bootstrapping.

5. The endpoint of claim 1, wherein the endpoint dynamically obtains configuration data including at least one selected from the group consisting of software, firmware, and a field programmable gate array configuration, over a network.

6. The endpoint of claim 1, wherein the electronic processor is further configured to compress the unique identifier and the data associated with the field device prior to encryption with the cryptographic hardware component.

7. The endpoint of claim 1, wherein the remote server includes a plurality of servers and the endpoint communicates the unique identifier and the data associated with the field device to each of the plurality of servers.

8. The endpoint of claim 1, wherein the communication interface includes at least one selected from the group consisting of a 802.11 communication interface, a 802.15 communication interface, a cellular communication interface, a wired Ethernet communication interface, and a Bluetooth communication interface and communicates with the remote server directly or through an intermediate relay device.

9. The endpoint of claim 1, further comprising a copy of the communication interface allowing an alternative data exfiltration path.

10. The endpoint of claim 1, further comprising hardware monitoring for malicious attacks within the protected boundary.

11. The endpoint of claim 1, further comprising hardware monitoring for physical tampering within the protected boundary.

12. The endpoint of claim 1, wherein the field device includes at least one selected from the group consisting of an ultrasonic range sensor inserted into an orifice in a container, a potentiometer sensor attached to a mechanical level indicator, a ranging sensor determining a level of material within a container, a flow sensor, a pressure sensor, a vibration sensor, a temperature sensor, an optical sensor, a medical sensor for a medical device.

13. The endpoint of claim 1, wherein the field device includes at least one selected from the group consisting of a switch, a valve, a hydraulic piston, a shutoff valve controlling a level within a container, and a medical actuator.

14. The endpoint of claim 1, wherein the endpoint triggers a communication to at least one selected from the group consisting of an analysis thread and a control thread at the remote server.

15. The endpoint of claim 1, wherein the endpoint ignores communications received from an unauthentic server.

16. The endpoint of claim 1, wherein the communication interface includes a plurality of communication interfaces and wherein the endpoint selects one of the plurality of communication interfaces to use based on a property of a communication channel used by each of the plurality of communication interfaces, the property including at least one selected from the group consisting of availability, signal strength, signal-to-noise ratio, interference, a temporal profile, and a historical profile.

17. The endpoint of claim 16, wherein the endpoint selects the one of the plurality of communication interfaces non-deterministically.

18. The endpoint of claim 1, further comprising an input mechanism for calibrating the endpoint prior to use, wherein the endpoint is calibrated by receiving input through the input mechanism when a linear potentiometer included in the field device and affixed to a level indicator of a container is physically positioned at a first position including one of the minimum level and the maximum level and subsequently receiving input through the input mechanism when the linear potentiometer is physically positioned at a second position opposite the first position.

19. The endpoint of claim 1, further comprising an input mechanism, wherein the electronic processor receives user input through the input mechanism and verifies a physical presence of an authorized operator at the endpoint based on the user input.

20. The endpoint of claim 1, wherein any communication with the endpoint has a fixed format and a fixed length.

21. An endpoint comprising:
a connection to a field device;
a communication interface for communicating with a remote server;
an electronic processor located within a protected boundary of the endpoint, wherein the protected boundary is coincident with a physical boundary of a single chip;
memory located within the protected boundary of the endpoint, the memory storing a unique identifier associated with a single-writer thread at the remote server writing data associated with the field device and an output thread at the remote server; and
a cryptographic hardware component located within the protected boundary,
wherein the electronic processor is configured to encrypt the unique identifier and data associated with the field device with the cryptographic hardware component for transmission outside the protected boundary over the communication interface even when the communication interface employs an encryption protocol and to explicitly omit unencrypted transmission of the unique identifier and the data outside the protected boundary, wherein the output thread is associated with private data,
wherein the endpoint does not include an association between the unique identifier and the private data,
wherein the endpoint and the remote server explicitly omit the association between the unique identifier and the private data from any communication with the endpoint, wherein the endpoint and the remote server explicitly omit the unique identifier from any communications not with the endpoint.

22. A system comprising:
an endpoint; and
a server remote from the endpoint,
the endpoint including
   a connection to a field device;
   a communication interface for communicating with the server;
   a single-chip device defining a protected boundary of the endpoint co-incident with a boundary of the single-chip device;
   an electronic processor located within the protected boundary of the endpoint;
   memory located within the protected boundary of the endpoint, the memory storing a unique identifier associated with a single-writer thread at the server writing data associated with the field device and an output thread at the server; and
   a cryptographic hardware component located within the protected boundary,
   wherein the electronic processor is configured to encrypt the unique identifier and data associated with the field device with the cryptographic hardware component for transmission outside the protected boundary over the communication interface even when the communication interface employs an encryption protocol and to explicitly omit unencrypted transmission of the unique identifier and the data outside the protected boundary,
   wherein the output thread is associated with private data,
   wherein the endpoint does not include an association between the unique identifier and the private data,
   wherein the endpoint and the server explicitly omit the association between the unique identifier and the private data from any communication with the endpoint,
   wherein the endpoint and the server explicitly omit the unique identifier from any communications not with the endpoint, and the server generating the single-writer thread,
   wherein the single-writer thread writes the data associated with the field device to a file uniquely identified by the unique identifier without placing restrictions to prevent any other writer threads from writing to the file.

23. The system of claim 22, wherein at least one selected from the group consisting of the endpoint and the server uses quantity information and timestamp information from a container to produce at least one selected from the group consisting of a burn rate estimate and a flow rate estimate used to predict a time-to-expenditure.

24. The system of claim 22, wherein at least one selected from the group consisting of the endpoint and the server couples quantity information and flow rate information with historical data to address a failure.

25. The system of claim 22, wherein at least one selected from the group consisting of the endpoint and the server couples quantity information and flow rate information using an estimation technique to account for a mixed population of users, where some users included in the mixed population of users do not possess an endpoint with an associated sensor.

26. The system of claim 25, wherein the estimation technique includes at least one selected from the group consisting of regression analysis and degree-day calculations.

27. The system of claim 22, wherein the endpoint and the server explicitly omit a physical location of the endpoint from communications with the endpoint and wherein the server does not include the physical location.

* * * * *